Sept. 6, 1966 A. M. SHROFF 3,271,280
METHOD FOR MANUFACTURING COLD-EMISSION CATHODES
Filed June 4, 1963
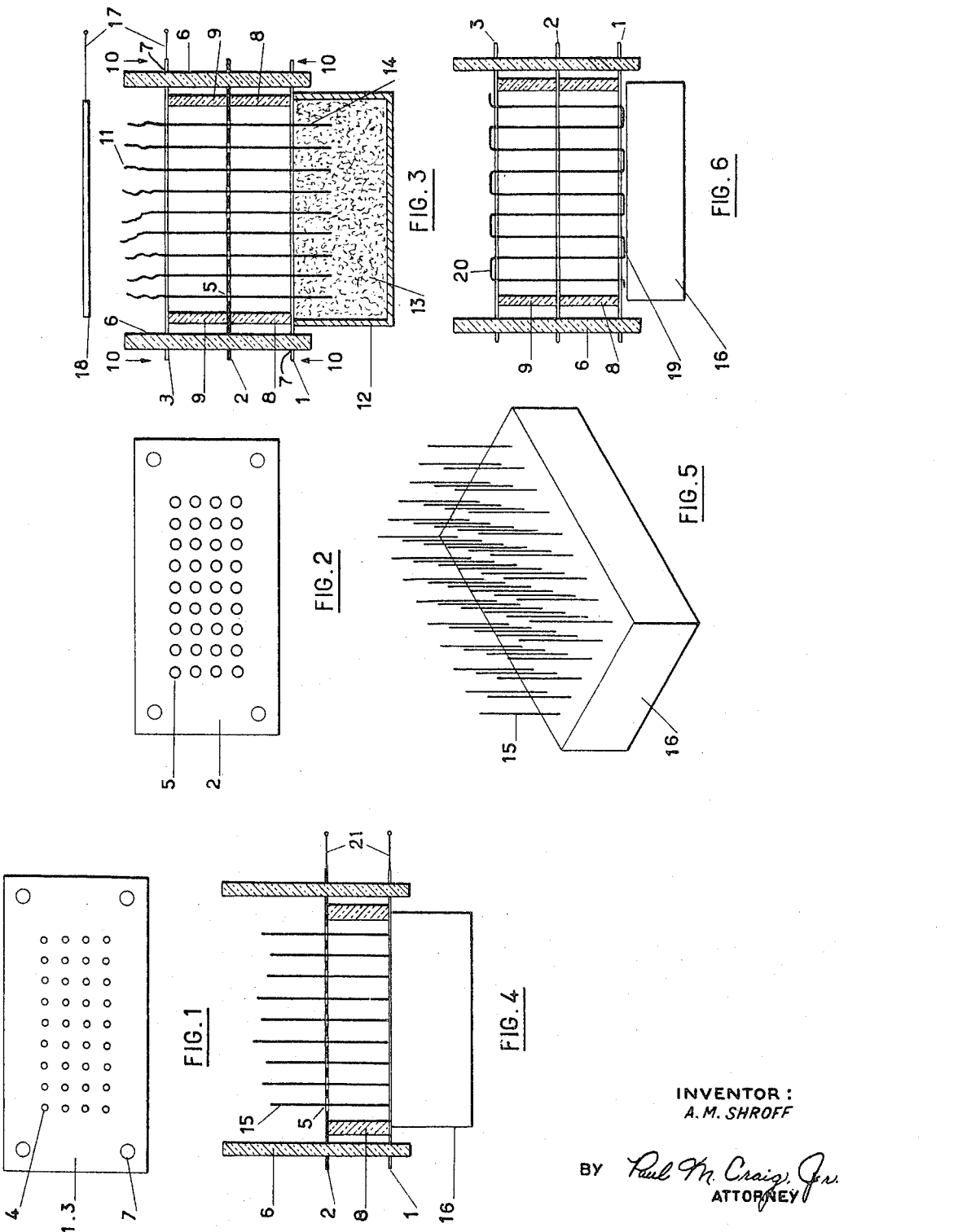
INVENTOR:
A. M. SHROFF United States Patent Office 3,271,280
Patented Sept. 6, 1966

3,271,280
METHOD FOR MANUFACTURING COLD-EMISSION CATHODES
Arvind M. Shroff, Paris, France, assignor to CSF-Compagnie Generale de Telegraphie Sans Fil, Paris, France
Filed June 4, 1963, Ser. No. 285,404
Claims priority, application France, June 29, 1962, 902,437
8 Claims. (Cl. 204—142)

The present invention relates to a method of manufacturing cold emission cathodes, and more particularly to a method of manufacturing multi-point cold-emission cathodes having a plurality of closely spaced uniformly dimensioned electron emitting rods.

Known in the prior art are the cold-emission cathodes constituted by very tapered points, that is having a very small radius of curvature at the end, with the density of current emitted by a point only depending, for a given voltage, on this radius of curvature and on the working potential of the emitter material. To increase the total current intensity, one multiplies these points by providing undimensional networks in the form of combs or bidimensional networks in the form of brushes or arrays. These structures are manufactured generally by setting or driving in, by a mechanical operation, rods pointed beforehand into a suitable support, or by proceeding to a collective pointing of such rods by a mechanical or electrochemical operation after such setting or driving-in operation. Nevertheless, these operations become difficult to carry out with desired precision and reproducibility, in particular when one diminishes the distance between parallel points, which is necessary when one desires to produce a cathode of relatively reduced dimensions delivering a relatively significant current. Particularly, when the distance between points is reduced to the order of magnitude of 1 mm., it is practically impossible, with the known prior art methods, to provide an array which, at the same time, is composed of sufficiently and uniformly pointed points and which is rigorously plane, that is wherein the extremities of the points are exactly in the same plane. In effect, if the points are prepared beforehand, assuming and admitting that the radii of curvature thereof at the end are sufficiently small and uniform, it becomes impossible to set or drive the same into a support by a mechanical operation with sufficient precision in order that the array be rigorously plane. If, in contrast thereto, one at first drives in or sets the rods and thereafter attempts to cut or machine the same to finish or true up the rods to the same length, one destroys the tapering of the points. If, on the other hand, after having set or driven in the rods, one attempts to point the same and simultaneously therewith to cut the same to a given length by way of electrochemical attack within a bath in which the tension or voltage would be applied between the array of points, on the one hand, and an electrode facing the same, on the other, experience shows that the desired pointing can be obtained with a sufficient degree and a satisfactory uniformity but that the array is no longer plane but represents troughs or bosses by reason of the non-linearity of the electric lines of force within the bath.

The present invention has as its object a novel method of manufacture making it possible to realize multi-point cathodes in the form of combs or arrays, in particular with points relatively closely spaced, in such a manner as to avoid the inconveniences noted hereinabove with the known methods, that is, to obtain arrays that are rigorously plane and composed of tapered points with a radius of curvature sufficiently small and with sufficient uniformity.

According to the present invention, after having fixed the rods to the support, one proceeds to the simultaneous pointing thereof combined with the finishing thereof to the desired length by electrochemical attack within an assembly comprising the use of an electrode in the form of a grid, through the meshes of which pass the rods of the array or comb with a certain play, in such a manner as to constitute about each rod an individual cell of an electrochemical bath.

According to another feature of the present invention, the wires intended to form the points of the array and passing through the meshes of the aforementioned electrode are initially mounted or strung between two centering grids disposed on both sides of the aforementioned electrode.

The support may be formed by sintering metallic powder into which are driven preliminarily the extremities of the wires leaving one of the centering grids.

According to a modification of the present invention, the support may be of solid metal to which are brazed the extremities of the wires.

The disposition of a network of parallel wires held or strung between the centering grids may be effectuated by weaving a continuous wire through the orifices of these grids.

Accordingly, it is an object of the present invention to provide a method of manufacturing multi-point cold-emission cathodes capable of producing high density currents which eliminates by simple means and in an extremely effective manner the shortcomings and drawbacks encountered with the prior art methods.

It is another object of the present invention to provide a method for realizing multi-point cold-emission cathodes which permits close spacing of the emission rods without imparing the uniformity in length thereof and the relatively very small radii of curvature of the tapered points thereof.

Still another object of the present invention resides in the provision of a method for manufacturing multi-point cold-emission cathodes which can be manufactured with a high degree of precision in spacing and length thereof, in which the points are disposed substantially in a single plane, and without sacrifice of the safe securing thereof in the support member.

These and other objects, features and advantages of the present invention will become more obvious from the following description when taken in connection with the accompanying drawing which shows, for purposes of illustration only, two embodiments in accordance with the present invention, and wherein:

FIGURE 1 is a plan view of one of the two types of grids utilized in the method of manufacture according to the present invention.

FIGURE 2 is a plan view of the other of the two types of grids utilized in the method according to the present invention, FIGURE 3 is a longitudinal cross sectional view of the assembly utilized in the first phase of the method according to the present invention, FIGURE 4 illustrates the assembly of FIGURE 3 in a later phase of the same method, FIGURE 5 is a perspective view illustrating the product obtained by the method according to FIGURES 3 and 4, and FIGURE 6 is a cross sectional view, similar to FIGURE 3, of a modified embodiment of an assembly in accordance with the present invention.

Referring now to the drawing wherein like reference numerals are used throughout the various views to designate like parts, in the process according to the present invention, one begins by forming a rigid block from three parallel grids, of which the outer grids 1 and 3 are of the type illustrated in FIGURE 1 and the intermediate grid 2 is of the type illustrated in FIGURE 2. The grids 1, 3 and 2 of the two types comprise a network of apertures with the same pitch, however, the apertures 4 of the grids 1 and 3 are fitted sufficiently accurately to the rods of the array constituted thereby whereas the orifices 5 of the grid 2 are slightly larger. For example, if the rods are of tungsten wire 0.12 mm. in diameter, the orifices 4 may be 0.125 mm. in diameter and the orifices 5 may be 0.5 mm. in diameter. The rigid block comprising the grids 1, 2 and 3 is prepared by utilizing insulating pins 6 (FIGURE 3) which center the grids by means of the apertures 7, by disposing insulating spacers 8 and 9 between successive grids, and by tightening the assembly by conventional means (not illustrated) in the direction of arrows 10.

One mounts next a network of parallel wires between the outermost grids 1 and 3, for example, utilizing a bundle of tungsten wires 11 and by threading the wires individually through the orifices 4 of the grids 1 and 3, whereby these wires also pass through the larger orifices 5 of the grid 2. Subsequently the rigid block is placed on a container 12 filled with powder 13, for example, nickel, into which are embedded or driven the extremities 14 of the wires 11 that extend beyond the grid 1. After sintering, one obtains a solid support in which are embedded the wires 11.

Thereupon one proceeds with the shortening of the wires 11, by cutting the same at the level of the plane of grid 3 or within a plane parallel thereto, by any suitable mechanical or electrochemical operation. For example, one may dip or immerse the assembly in an electrolytic bath comprising an electrode 18 facing the array 11, whereby the voltage is applied by way of connections 17 between this electrode 18 and the grid 3. The wires of the array 11 are thereby cut in the plane of this grid without, however, tapering the cut ends by reason of the short-circuit between the grid 3 and the wires. In this stage of operation, the obtaining of tapered points of exactly the same length has no importance. After having removed the grid 3 and the spacers 9, one obtains according to FIGURE 4 a network of rods without taper and which may not be exactly of the same length, embedded within a support 16. The block of the grids 1 and 2 still remains in place with a view to the pointing operation by electrochemical attack.

This operation may take place, for example, within a bath of NaOH with application of voltage by way of the connections 21 to the grid 2, on the one hand, and to the rods 15, on the other. Each orifice 5 forms about the corresponding rod an individual electrolysis cell in such a manner that the rods 15 are simultaneously and uniformly tapered and are cut to the same length within the plane of the grid 2. After removing the grids 1 and 2 one obtains then a finished cathode illustrated in perspective in FIGURE 5, which may have, for example 10×20 points spaced apart by 1 mm., that is of total dimensions of the order of 10×20 mm.

The present invention is not limited to the embodiment so far described for illustrative purposes only but may be modified in numerous ways without changing its principle. For example, instead of threading the wires of a bundle 11 into the orifices 4, as shown in FIGURE 3, one may string or weave a continuous wire by passing in one and the other direction through the successive grids, as indicated in FIGURE 6. In lieu of embedding the extremities of the wires within metallic powder, one may then also braze horizontal portions 19 of the wires extending along the grid 1 to a solid support 16 prepared beforehand. After cutting the horizontal portions 20 of the wires, for example, by electrochemical attack, as in FIGURE 3, one obtains the same configuration as in FIGURE 4 and proceeds to the electrochemical pointing ac- action as already described in connection with the first embodiment.

While I have shown and described two modifications in accordance with the present invention, it is understood that the same is not limited thereto but is susceptible of numerous changes and modifications within the spirit and scope thereof, as known to a person skilled in the art, and I therefore do not wish to be limited to the details shown and described herein for illustrative purposes only but intend to cover all such changes and modifications as are encompassed by the scope of the appended claims.

I claim:
1. A method for manufacturing cold-emission cathodes having a plurality of substantially parallel point-ended metal rods, comprising the steps of: passing said rods through the holes in a grid-like structure the diameter of said holes being slightly larger than the diameter of said rods; fixing said rods to a support; immersing the assembly of said support, rods and grid-like structure in an electrochemical bath; and applying an electrochemically acting voltage between said rods and said grid-like structure until said rods are simultaneously cut to the same length and tapered to thereby produce the said pointed ends thereof.

2. A method for manufacturing cold-emission cathodes having an array of substantially parallel point-ended metal rods, comprising the steps of: passing said rods through the holes in a first grid-like structure located at a predetermined distance from the eventual support, the diameter of said holes being slightly larger than the diameter of said rods; aligning said rods by passing the same through holes provided in two further grid-like structures located on both sides of said first grid-like structure, the size of the holes in said further grid-like structures being closely fitted to the diameter of said rods; fixing said rods to the support; immersing the assembly of said support, rods and grid-like structures in an electrochemical bath; and applying an electrochemically acting voltage between said rods and said first grid-like structure until said rods are simultaneously cut to the same length and tapered to thereby produce the pointed ends.

3. A method for manufacturing cold-emission cathodes having a plurality of substantially parallel point-ended metal rods, comprising the steps of: passing said rods through the holes in a grid-like structure located at a predetermined distance from an eventual support, the diameter of said holes being slightly larger than the diameter of said rods; fixing said rods to the support by driving one end of each of said rods into a mass of metal powder and sintering the metal powder; immersing the assembly of said support, rods and grid-like structure in an electrochemical bath; and applying an electrochemically acting voltage between said rods and said grid-like structure until said rods are simultaneously cut to the same length and tapered to thereby produce the pointed ends.

4. A method for manufacturing cold-emission cathodes having a plurality of substantially parallel point-ended metal rods, comprising the steps of: passing said rods through the holes in a grid-like structure located at a predetermined distance from an eventual support, the diameter of said holes being slightly larger than the diameter of said rods; fixing said rods to the support by brazing said rods to a massive metal body; immersing the assembly of said support, rods and grid-like structure in an electrochemical bath; and applying an electrochemically acting voltage between said rods and said grid-like structure until said rods are simultaneously cut to the same length and tapered to thereby produce the pointed ends.

5. A method for manufacturing cold-emission cathodes having an array of substantially parallel point-ended metal rods, comprising the steps of: assembling a grid-like structure including a first grid-like structure located at a predetermined distance from an eventual support and two further grid-like structures; forming the array of said substantially parallel rods by passing a continuous wire to and fro through the holes provided in said first grid-like structure and through the holes provded in said two further grid-like structures which are located on both sides of said first grid-like structure, the diameter of the holes in said first grid-like structure being slightly larger than the diameter of the rods and the size of the holes in said two further grid-like structures being closely fitted to the diameter of said rods; fixing said rods to the support, immersing the assembly of said support, rods and grid-like structures in an electrochemical bath; and applying an electrochemically acting voltage between said rods and at least said first grid-like structure until said rods are simultaneously cut to the same length and tapered to thereby produce the pointed ends.

6. A method for manufacturnig cold-emission cathodes having a plurality of substantially parallel point-ended metal rods, comprising the steps of: passing said rods through the holes in a first grid-like structure located at a predetermined distance from an eventual support, the diameter of said holes being slightly larger than the diameter of said rods; aligning said rods by passing them through holes provided in at least one further grid-like structure located on either side of said first grid-like structure, the size of the holes in said further grid-like structure being closely fitted to the diameter of said rods; fixing said rods to the support; immersing the assembly of said support, rods and first grid-like structure in an electrochemical bath; and applying an electrochemically acting voltage between said rods and said first grid-like structure until said rods are simultaneously cut to the same length and tapered to thereby produce the pointed ends.

7. A method for manufacturing cold-emission cathodes having a plurality of substantially parallel point-ended metal rods, comprising the steps of: passing said rods through the holes in a first grid-like structure located at a predetermined distance from an eventual support, the diameter of said holes being slightly larger than the diameter of said rods; aligning said rods by passing them through holes provided in at least one further grid-like structure located on either side of said first grid-like structure, the size of the holes in said further grid-like structure being closely fitted to the diameter of said rods; fixing said rods to the support by driving one end of each of said rods into a mass of metal powder and sintering the metal powder; immersing the assembly of said support, rods and first grid-like structure in an electrochemical bath; and applying an electrochemically acting voltage between said rods and said first grid-like structure until said rods are simultaneously cut to the same length and tapered to thereby produce the pointed ends.

8. A method for manufacturing cold-emission cathodes having a plurality of substantially parallel point-ended metal rods, comprising the steps of: passing said rods through the holes in a first grid-like structure located at a predetermined distance from an eventual support, the diameter of said holes being slightly larger than the diameter of said rods; aligning said rods by passing them through holes provided in at least one further grid-like structure located on either side of said first grid-like structure, the size of the holes in said further grid-like structure being closely fitted to the diameter of said rods; fixing said rods to the support by brazing said rods to a massive metal body; immersing the assembly of said support, rods and first grid-like structure in an electrochemical bath; and applying an electrochemically acting voltage between said rods and said first grid-like structure until said rods are simultaneously cut to the same length and tapered to thereby produce the pointed ends.

References Cited by the Examiner
UNITED STATES PATENTS

| | | | |
|---|---|---|---|
| 2,654,795 | 10/1953 | Brill et al. | 136—120 |
| 2,721,838 | 10/1955 | Visser | 204—142 |
| 2,850,448 | 9/1958 | Stricker | 204—242 |
| 3,084,788 | 4/1963 | Ford | 260—17 |

JOHN H. MACK, *Primary Examiner.*

R. MIHALEK, *Assistant Examiner.*